US007124231B1

(12) United States Patent
Garner et al.

(10) Patent No.: US 7,124,231 B1
(45) Date of Patent: Oct. 17, 2006

(54) SPLIT TRANSACTION REORDERING CIRCUIT

(75) Inventors: Trevor Garner, Apex, NC (US); Kenneth H. Potter, Raleigh, NC (US); Hong-Man Wu, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 367 days.

(21) Appl. No.: 10/172,172

(22) Filed: Jun. 14, 2002

(51) Int. Cl.
*G06F 13/36* (2006.01)

(52) U.S. Cl. .................. 710/310; 710/112; 710/22; 710/311

(58) Field of Classification Search .............. 710/22, 710/110, 112, 305, 306, 308, 310, 311, 316; 709/203; 714/9
See application file for complete search history.

(56) References Cited

U.S. PATENT DOCUMENTS

| | | | |
|---|---|---|---|
| 5,469,435 A * | 11/1995 | Krein et al. ............... 370/462 |
| 5,918,070 A * | 6/1999 | Moon et al. ............... 710/22 |
| 6,209,054 B1 | 3/2001 | Lee | |
| 6,230,241 B1 | 5/2001 | McKenney | |
| 6,356,548 B1 | 3/2002 | Nellenbach et al. | |
| 6,438,102 B1 | 8/2002 | Chui et al. | |
| 6,477,174 B1 | 11/2002 | Dooley et al. | |
| 6,493,776 B1 * | 12/2002 | Courtright et al. .......... 710/110 |
| 6,505,228 B1 | 1/2003 | Schoening | |
| 6,757,768 B1 * | 6/2004 | Potter et al. ................. 710/112 |
| 2003/0110340 A1* | 6/2003 | Butler et al. ................. 710/305 |

* cited by examiner

*Primary Examiner*—Khanh Dang
(74) *Attorney, Agent, or Firm*—Cesari and McKenna LLP

(57) ABSTRACT

The present invention provides a technique for ordering responses received over a split transaction bus, such as a HyperTransport bus (HPT). When multiple non-posted requests are sequentially issued over the split transaction bus, control logic is used to assign each request an identifying (ID) number, e.g. up to a maximum number of outstanding requests. Similarly, each response received over the split transaction bus is assigned the same ID number as its corresponding request. Accordingly, a "response memory" comprises a unique memory block for every possible ID number, and the control logic directs a received response to its corresponding memory block. The responses are extracted from blocks of response memory in accordance with a predetermined set of ordering rules. For example, the responses may be accessed in the same order the corresponding non-posted requests were issued.

52 Claims, 14 Drawing Sheets

SPLIT TRANSACTION REORDERING CIRCUIT

FIELD OF THE INVENTION

This invention relates generally to split transaction buses, and more specifically, to maintaining order among responses received over a split transaction bus.

BACKGROUND INFORMATION

A computer network is a geographically distributed collection of interconnected subnetworks for transporting data between nodes, such as computers. A local area network (LAN) is an example of such a subnetwork; a plurality of LANs may be further interconnected by an intermediate network node, such as a router or switch, to extend the effective "size" of the computer network and increase the number of communicating nodes. The nodes typically communicate by exchanging discrete frames or packets of data according to predefined protocols. In this context, a protocol consists of a set of rules defining how the nodes interact with each other.

Each node typically comprises a number of basic systems including a processor, a main memory and an input/output (I/O) system. Data is transferred between the main memory, processor and I/O system over a system bus, while data transactions within the I/O system occur over an external bus, such as an I/O bus. Each bus typically consists of either address, data and control lines, with the control lines carrying control signals specifying the direction and type of transfer, or a pair of unidirectional communication lines for passing bus packets containing address, data and control information, such as in the case of a HyperTransport (HPT) bus. For example, the processor (i.e., a source) may issue a read transaction to request the transfer of data from an addressed location on an I/O device (i.e., a target) coupled to the I/O bus and over the system bus to the processor. The processor then processes the retrieved data in accordance with instructions that may have been obtained from main memory. The processor may thereafter issue a write transaction requesting that the results be stored in, e.g., an addressed location in the main memory.

Some buses operate in an "atomic" manner such that the source is granted exclusive access (i.e., control) to the bus until the transaction is complete. However, an atomic bus may potentially waste bus cycles, particularly when waiting for data in response to, e.g., a read request. In a split transaction bus, on the other hand, the source relinquishes control over the bus once the request is sent and an independent response to the request is subsequently returned to the source. Here, the target acquires control of the bus to return the response to the source. The split transaction bus thus essentially enables a transaction to be divided into at least two transfers: the request and the response.

Devices coupled to the split transaction bus typically include common sets of resources (such as buffers or queues) used to store request and response transfers sent over the bus. It is possible that some of the resources may be consumed by these transfers, thereby causing the bus to stall waiting on the resources to no longer be in use (freed). This stall, in turn, may result in a plurality of transferred requests concurrently awaiting responses (i.e., "outstanding") over the split transaction bus. These resources allow several requests to be concurrently awaiting responses over the split transaction bus. Responses to pending requests are additionally limited by the inherent latency of accessing memory locations over the bus.

When a plurality of requests are outstanding, memory access delays may result in responses arriving "out of order." That is, the responses may be received in a different order than their corresponding requests. For example, assume a source sends a non-posted request $R_0$ to a first target device over a split transaction bus, e.g. a HPT bus. Subsequently, the source sends a non-posted request $R_1$ over the bus to a second target device. As used herein, a non-posted request is a request requiring a response, such as a request to read data. In the situation where the second target device has a lower memory latency than the first target device (i.e., due to memory access optimizations or a faster memory controller), the response to request $R_1$ is received before the response to request $R_0$. Similarly, other consecutive requests may arrive "out of order" depending on how quickly their respective target devices process the requests.

Often, the order responses are received from a split transaction bus is important for reconstructing a packet of information, e.g. a network data packet. Typically, a sequence of responses is sequentially concatenated to form a discrete packet of data/information. The data packet may be used within a predefined network protocol, such as the TCP/IP protocol. Unordered responses may therefore inhibit proper construction of a received information packet.

Furthermore, the order responses are received from a split transaction bus can be important when the response data is retransmitted over another communication channel. These responses may comprise data that will be retransmitted over a general communication link having predefined ordering rules. Thus, responses received from the split transaction bus may have to be reordered to comply with the ordering protocol of the general communication link.

Often, target devices are responsible for returning responses in a predefined order over a split transaction bus. These target devices typically require dedicated resources, such as circuitry and memory structures, to implement an ordering protocol. However, resources configured to implement an ordering scheme in a target device may limit the device's "read" bandwidth, i.e. how quickly data is retrieved from memory. For example, if a first-in, first-out (FIFO) queue in a target device maintains the order of requests received from a split transaction bus, then a delay processing a first request in the queue affects the processing times for subsequent requests in the queue. In those situations where requesting sources are configured to reorder responses received from a split transaction bus, each source must consume resources and bandwidth to implement the ordering protocol.

SUMMARY OF THE INVENTION

The present invention is directed to a technique for ordering responses received by a network device over a split transaction bus, such as a HyperTransport bus (HPT). According to the invention, an intermediate "assist" device, e.g. within a DMA controller, receives responses from one or more target devices located over the bus and forwards the responses in a predetermined order to their requesting sources. Thus, the process of reordering responses is offloaded to the intermediate device without having to consume bandwidth and resources within the target devices and/or sources.

In an illustrative embodiment, when non-posted requests are sequentially issued over the split transaction bus for one or more requesting sources, control logic in the intermediate device assigns each request an identifying (ID)) number, e.g. up to a maximum number of outstanding requests. Each response received by the control logic over the split transaction bus is assigned the same ID number as its corresponding request. A response memory of the intermediate device comprises a unique memory block adapted to store a response for every possible ID number. Upon receiving a response, the control logic directs the response for storage at its corresponding memory block. The responses are subsequently extracted from blocks of the response memory in accordance with a predetermined set of ordering rules. For example, the responses may be accessed in the same order the corresponding non-posted requests were issued.

The control logic includes both a tag counter and a response counter. The tag counter assigns an ID number to each issued request based on a predetermined order, e.g. consecutive integers, and continues to assign ID numbers until the control logic detects a "wrap-around" condition. By definition, a wrap-around condition exists when the tag counter has assigned a maximum number of ID numbers without a response, e.g. a 5 bit tag counter can issue a maximum of 32 ($2^5$) ID numbers simultaneously. When a wrap-around condition is detected, the control logic sets a flag that indicates no additional requests may be sent over the split transaction bus until the response corresponding to the next consecutive tag is received.

The response counter determines the order responses are extracted from the response memory. Each block of the response memory is addressed by an index, such as an ID number, and has an associated "valid bit." The valid bit indicates whether the memory block stores a response received from the split transaction bus, whereas the response counter stores the index of the next response memory block to be read. When a valid bit indicates a response has been received and the response counter is indexing that block, the response is extracted from the memory block and its valid bit is reset. In this way, the response counter generates a sequence of indexes that defines the order responses are retrieved from the response memory.

Further to the illustrative embodiment, separate control logic, such as separate tag counters and response counters, may be implemented for requests requiring ordered and non-ordered responses. For instance, a first tag counter may generate ID numbers for requests that require responses in a predetermined order, while a second tag counter may generate ID numbers for requests that do not require ordered responses. Moreover, the second tag counter may be implemented as an unordered list of ID numbers that are assigned to the requests. In addition, a first response counter may generate a predetermined sequence of indexes to extract ordered responses, while a second response counter may extract responses from the response memory in any order. An "ordering flag," i.e. a bit flag, is set in each request to designate which set of control logic handles the request and its response.

Operationally, bus logic or control logic within the intermediate device may include functionality, such as byte-swapping, applied to either the ordered responses or the non-ordered responses. Alternatively, a flag in individual responses may indicate which responses require special processing, i.e. byte-swapping. Further, the blocks of response memory may be partitioned for storing ordered and non-ordered responses. In the illustrative embodiment a "hard partition" is implemented between the ordered and non-ordered responses. That is, each set of control logic may only access data, via hardware or software controls, in its allotted range of response memory addresses.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN
ILLUSTRATIVE EMBODIMENT

A. Intermediate Nodes in a Network

Figure 1:
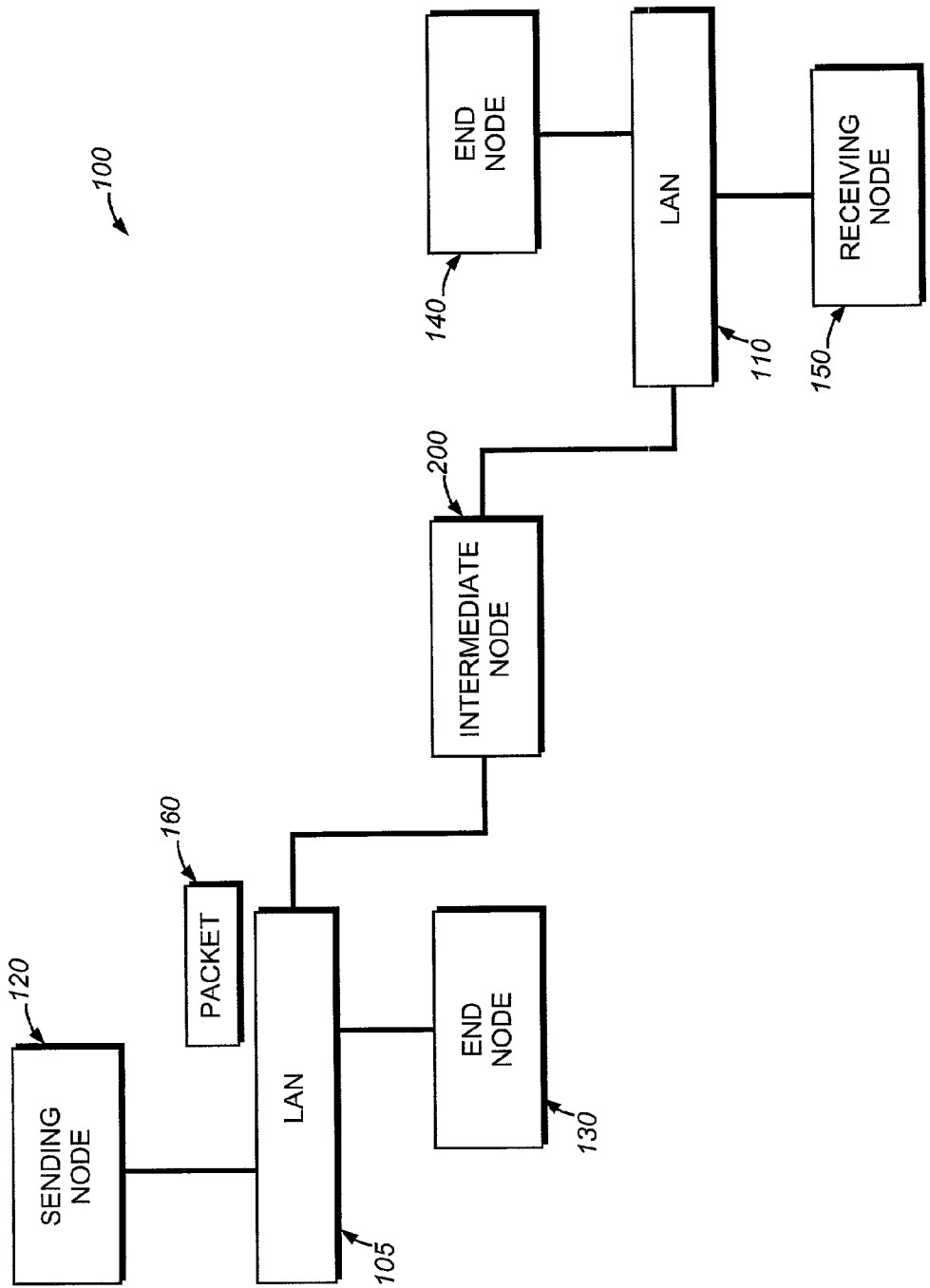
FIG. 1 is a schematic block diagram of a computer network comprising a collection of interconnected subnetworks and nodes, including an intermediate network node.

FIG. 1 is a block diagram of a computer network 100 comprising a collection of interconnected subnetworks and nodes. The nodes may comprise computers including end nodes 130 and 140, such as a sending end node 120 and a receiving end node 150, and an intermediate network node 200, the latter of which may be a switch or router. The subnetworks 105, 110 included within network 100 are preferably local area networks (LANs) interconnected by the intermediate node 200, although the networks may comprise other communication links, such as wide area networks. Communication among the nodes coupled to the LANs is typically effected by exchanging discrete packets 160 among the nodes.

For example, the sending node 120 generates a data packet 160 by encapsulating "payload" data within headers, such as conventional data link and network layer headers, as the data passes through different layers of a protocol stack. The packet is then transmitted over the network to the intermediate node 200 which facilitates the flow of the data packet through the network by routing it to the proper receiving node 150. Specifically, the node 200 receives the packet from an input port, parses the data link and network layer headers, renders a forwarding decision for the packet, appends a new data link header to the packet and then transmits the packet to an output port.

Figure 2:
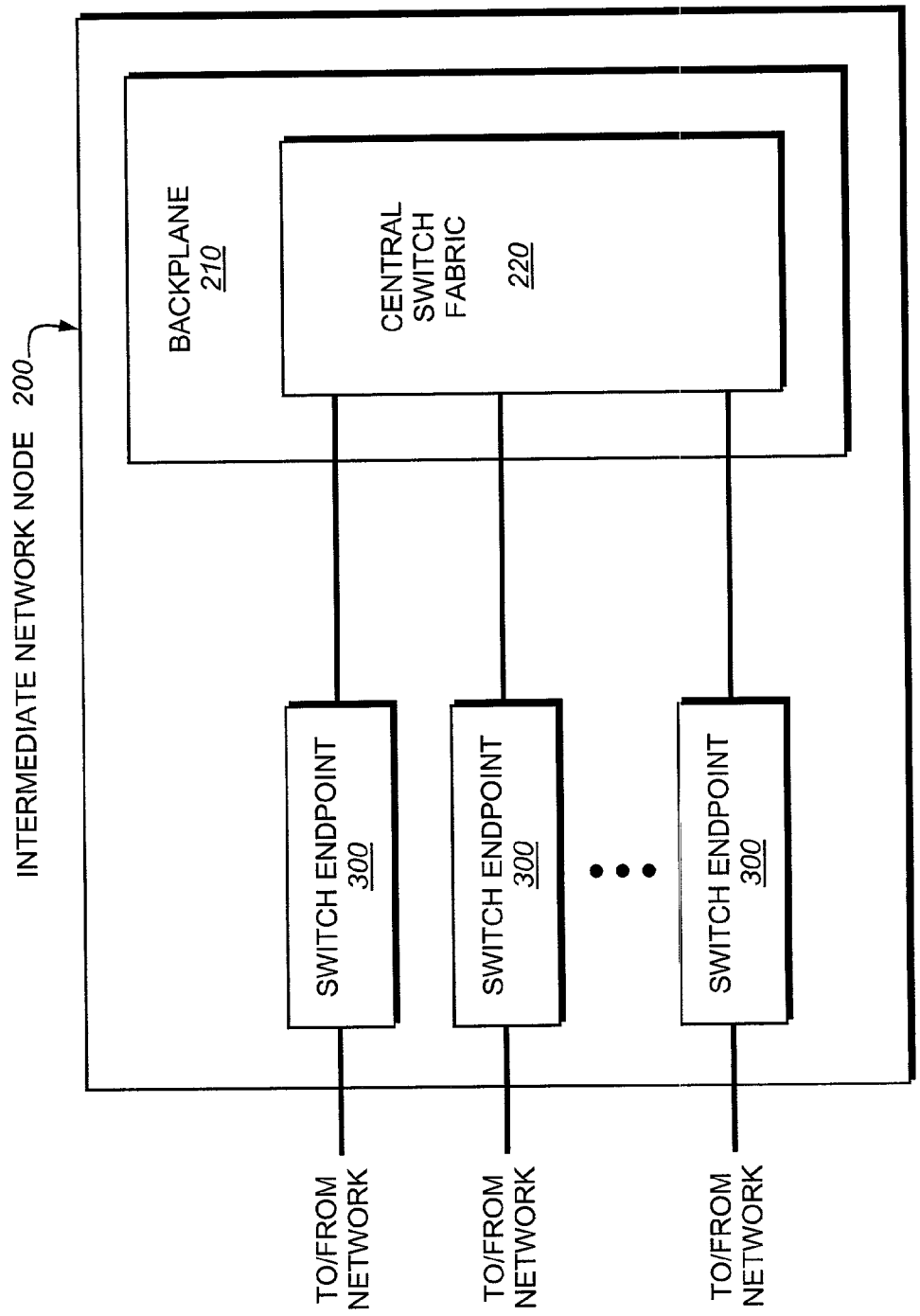
FIG. 2 is a schematic block diagram of an illustrative intermediate network node.

FIG. 2 is a schematic block diagram of an exemplary intermediate node 200. The node includes a plurality of switch endpoints 300 connected to a backplane 210. The backplane provides a medium for transferring data and signals from one switch endpoint to another and may include buses and logic in addition to a central switch fabric 220. The central switch fabric is responsible for redirecting the data and signals between switch endpoints. Each switch endpoint is connected to a respective network, such as a local area network or a wide area network, and to the central switch fabric.

Illustratively, a data packet is received from a network connected to a first switch endpoint. The received data is stripped of its network headers and new headers are prepended to the data packet based on a decision made by a forwarding engine, e.g. in the first endpoint. The forwarding engine may compose one or more processors programmed to "switch" (forward) data packets. The forwarded data is sent to the backplane and switched by switch fabric to a second endpoint indicated in the newly appended headers.

Figure 3:
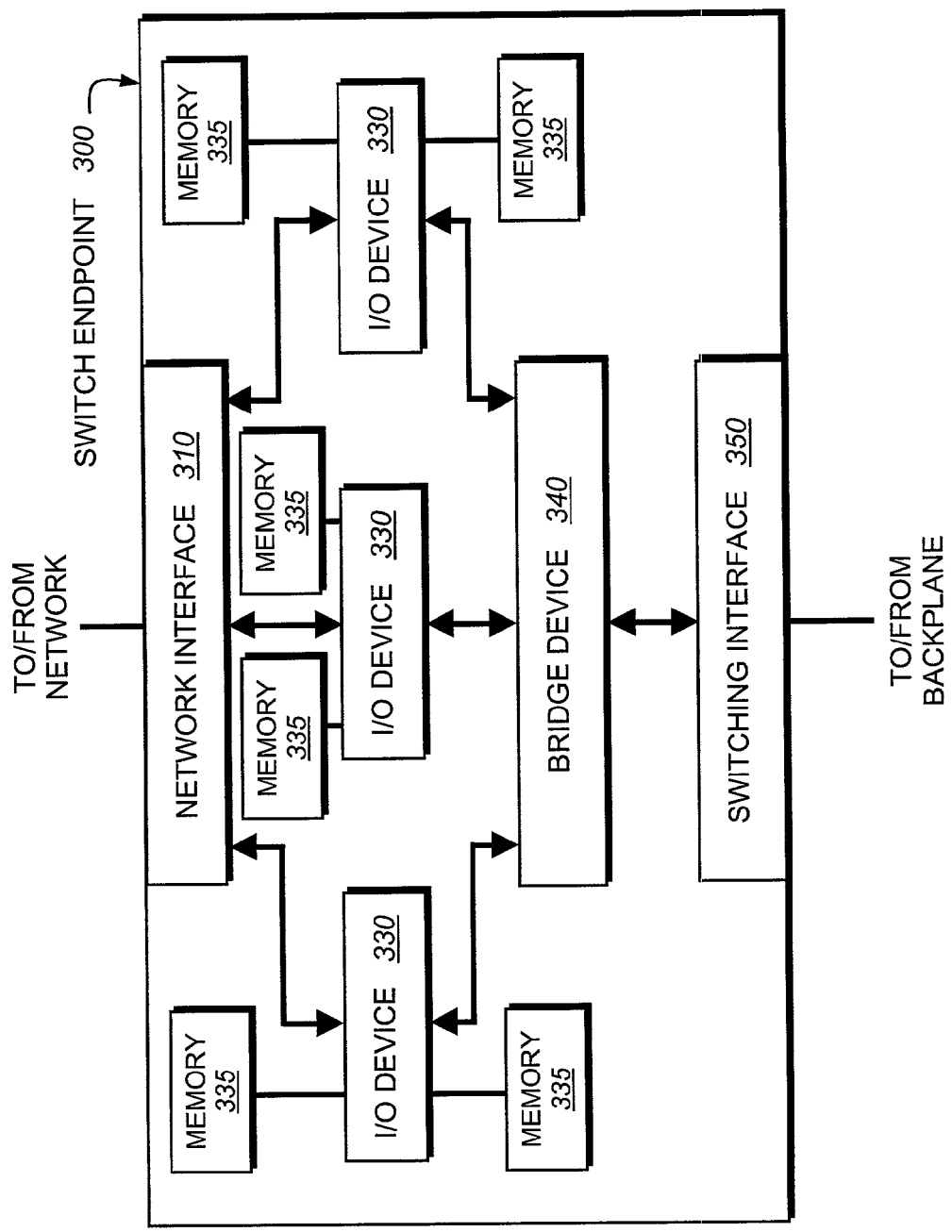
FIG. 3 is a schematic block diagram of a switch endpoint that may be implemented in the intermediate node of FIG. 2.

FIG. 3 illustrates a schematic block diagram of an exemplary switch endpoint 300. The endpoint comprises a network interface 310, a plurality of I/O devices 330, an "intermediate" bridge device 340, and a switching interface 350. The switch endpoint communicates with a network through a network interface 310 that includes, inter alia, transceivers, input and output ports and drivers that transmit data to/from the network. The network interface is typically configured to transmit and receive data according to a predefined network protocol, such as an Ethernet or TCP/IP protocol.

A plurality of I/O devices 330 are coupled to network interface 310. The I/O devices access data received by the network interface and store the data in one or more associated memories 335. The I/O devices may also process the received data, e.g. by stripping network headers and error-checking the data. In addition, forwarding decisions may be implemented by one or more of the I/O devices. Thus, it will be apparent to those skilled in the art that the devices 330 may include general purpose processors, memory controllers, application-specific integrated circuitry (ASIC), and/or specialized processors, depending on the types of processing required for data transferred to and from the network.

The bridge device 340 transfers data between the memories 335 attached to the I/O devices and a switching interface 350 that, in turn, transmits data to/from a backplane. An I/O device may interface with the bridge using a standard bus protocol, such as a conventional peripheral computer interconnect (PCI) bus or HyperTransport bus. However, the switching interface may expect data transfers using a different bus protocol, such as a common switch interface (CSIX) bus. Thus, when data is transferred from an I/O device to the switching interface (or vice versa), the bridge device converts the data from one bus protocol to another. As an example, an I/O device may be coupled to the bridge device over a split transaction bus, whereas the switching interface may be coupled to the bridge device over a cell-based bus. In this example, the bridge segments data from the split transaction bus into fixed-size cells used by the cell-based protocol and reassembles data from the cell-based bus into packets used by the split transaction protocol.

B. Reordering Response Data from a Split Transaction Bus

As previously described, a split transaction bus may be used to transfer data between two devices, such as a bridge device and an I/O device in a switch endpoint. A direct memory access (DMA) controller in one of the devices may request data stored in the other device by sending a non-posted request over the split transaction bus. As used herein, a non-posted request is a request requiring a response, such as a request to read data. Since the split transaction bus does not operate in an "atomic" manner, a plurality of requests may be sent over the bus before a reply is received. Thus, multiple requests may be simultaneously pending. Accordingly, responses to the outstanding requests may arrive "out of order" over the split transaction bus depending on the time required to process each pending request.

Figure 4:
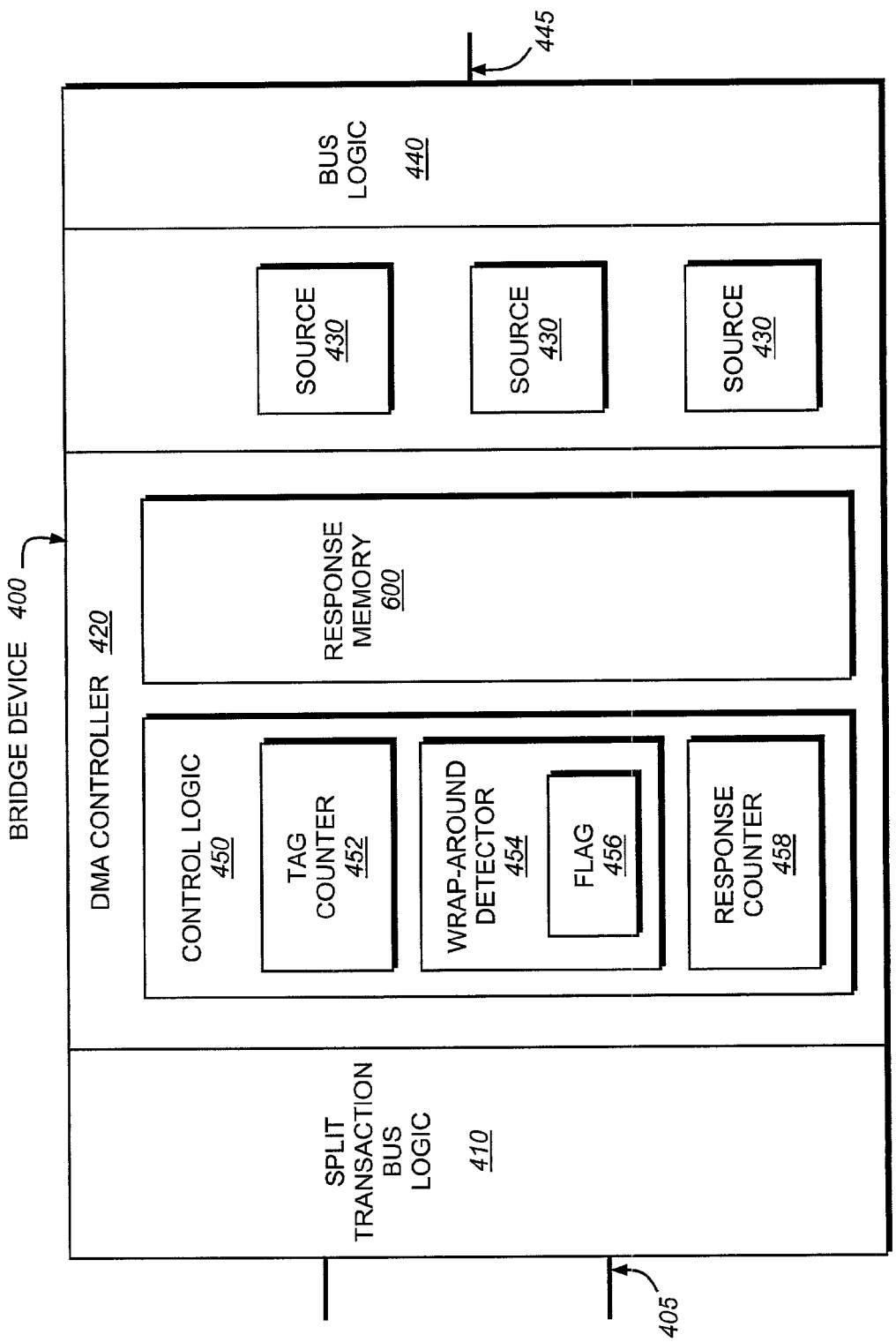
FIG. 4 is a schematic block diagram of a bridge device that may be implemented within the switch endpoint of FIG. 3.

FIG. 4 illustrates a bridge device 400 configured to reorder responses received over a split transaction bus 405 and retransmit the response data over a general communication link 445 having predefined ordering rules. As such, the bridge device includes split transaction bus logic 410 to interface with the split transaction bus and bus logic 440 to interface with the general communication link. Bus logic 410 and 440 comprise, inter alia, transceivers, logic and queues to "drive" data on and take data off each respective bus. Although only one split transaction bus is shown coupled to the logic 410, those skilled in the art will understand a plurality of buses may be connected to the bus logic when the bridge device is coupled to multiple I/O devices (e.g., see FIG. 3). Similarly, more than one general communication channel may be coupled to bus logic 440.

A plurality of sources 430 is tightly coupled to a DMA controller 420. Although the sources are shown within the bridge device, it is expressly contemplated they may be external to the bridge. Thus, the bridge may be understood as an intermediate "assist" device coupled to both the plurality of sources and a target device located over the bus 405. Broadly stated, the sources are logic blocks that initiate requests sent over the split transaction bus. For example, the sources may request a data packet stored in memory 335 coupled to the bridge device over the bus 405. The DMA controller receives the source requests and processes them using control logic 450 and response memory 600. To retrieve the requested data packet, the DMA controller 420 may issue one or more non-posted requests using split transaction bus packets (shown in FIG. 5).

The control logic manages the non-posted requests using a tag counter 452 and a "wrap-around" detector 454. For every non-posted request, the control logic issues a bus packet that is assigned a "tag" identifying number or tag ID. Each tag provides an index into a location in the response memory 600. As each tag is assigned, an ID associated with the requesting source is stored in a field of the corresponding location in the response memory.

The tag counter 452 generates a sequence of numbers based on a predetermined order, e.g. consecutive integers, and the value of the tag counter is used to assign a unique tag ID to each pending non-posted request. The width of the tag counter may limit the number of tag IDs that may be issued simultaneously, e.g. a 5 bit counter can assign a maximum of 32 ($2^5$) ID numbers without repetition. However, the maximum number of pending requests may also be limited by other design factors, such as bus bandwidth, and therefore can be set to any predetermined value. The wrap-around detector is used by the control logic to set a flag 456 when the number of outstanding non-posted requests over bus 405 equals the maximum permitted. Thus, no additional requests may be sent to the split transaction bus when the flag 456 is set.

Responses to the non-posted requests are received by the bus logic 410 and transferred to a response memory 600 in the DMA controller. The response memory comprises a unique memory block for every tag ID that may be assigned by tag counter 452. Thus, as responses are received over the split transaction bus 405, the responses are directed for storage at blocks of response memory according to the tag ID of their corresponding requests. For example, if a non-posted request is issued with a tag ID equal to N, then a corresponding block of response memory 600 is designated to store its response (e.g., the block of response memory is also assigned an ID number equal to N).

The control logic uses a response counter 458 to extract responses from the response memory in accordance with a predetermined set of ordering rules. Thus, the responses may be extracted from the response memory in the same order their corresponding non-posted requests were issued. More specifically, the response counter generates a sequence of indexes that defines the order that the contents of the response memory blocks are returned to requesting sources. Therefore, response data is returned in a predetermined order to the sources 430 and may be subsequently forwarded to bus logic 440 and transferred to the general communication link 445.

Figure 5:
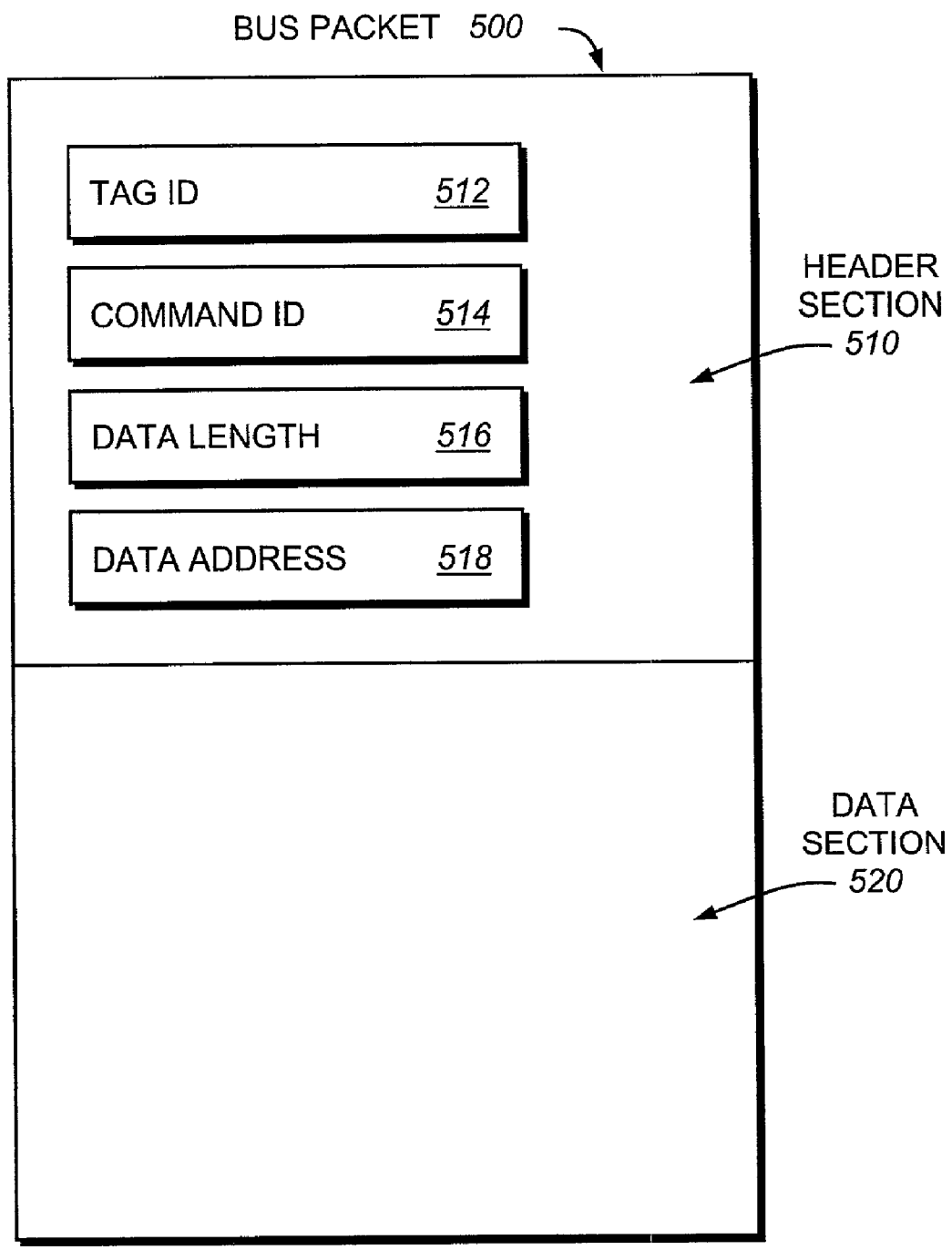
FIG. 5 is a schematic block diagram of an illustrative bus packet.

As shown in FIG. 5, requests and responses received over a split transaction bus 405 may be formatted as a bus packet 500. The bus packet includes a header section 510 and a data section 520, where the bus packet may comprise up to a fixed amount of data, e.g. 64 bytes. The header section comprises an exemplary request sent from a DMA controller to a target I/O device. The header section includes fields storing a tag ID 512, a command ID 514, a packet data length 516 and an address field 518.

Operationally, the DMA controller 420 receives a request from a source 430 tightly coupled to the controller, such as a compression engine. The source sends a source identifier, the length of a data block requested, and the address at which the data is located (e.g., in an I/O device). Control logic 450 in the DMA controller generates one or more bus packets to retrieve the data, where each bus packet is assigned a unique tag identifier 512. The command ID 514 field is set to identify a non-posted read command. Additionally, the bus packet includes the amount of data 516 requested by the packet and the address 518 where the data is located. Since this is a non-posted read request, the data section is not used.

A target device, such as an I/O device, returns the bus packet with elements of the request in the header section 510 and the requested data appended in the data section 520. The received bus packet ("response") may be subsequently stored in a block of a response memory corresponding to the tag ID 512. Because a response bus packet includes the same information as the request bus packet, the request and response have the same identifier 512.

Figure 6:
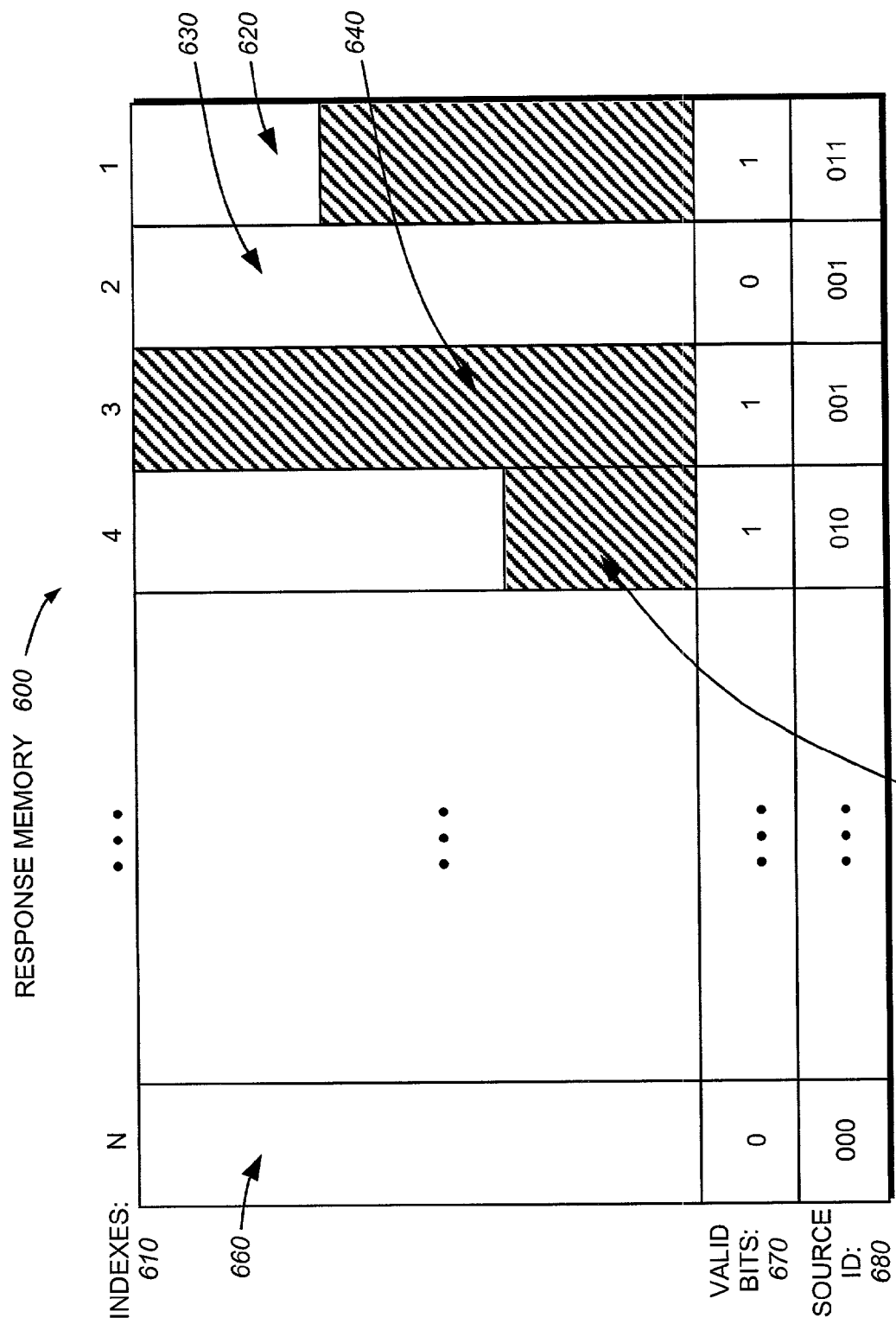
FIG. 6 is a schematic block diagram of an exemplary response memory that may be implemented in the bridge of FIG. 4.

FIG. 6 is a schematic block diagram of an exemplary response memory 600 that may be implemented in the controller of FIG. 4. The response memory is partitioned into N blocks of a predetermined size, e.g. 64 bytes, where each block corresponds to one of N possible ID numbers generated by the tag counter 452. Accordingly, each memory block is associated with an index 610. In addition, each memory block is associated with a "valid bit" 670 and a source ID 680. The valid bits indicate which memory blocks store responses that may be extracted from the response memory. For instance, valid bits equal to "1" indicate memory blocks 620, 640 and 650 store response data, and valid bits equal to "0" indicate blocks 630 and 660 do not store response data. Notably, the amount of response data stored in a memory block (shaded in FIG. 6) may be less than or equal to the predetermined size of the memory block. The source ID field stores the ID of the source of the request. For example, the source IDs 680 indicate that memory blocks 630 and 640 are designated to store responses to non-posted requests initiated by source 001, whereas responses for sources 010 and 011 are respectively stored in blocks 650 and 620.

Figure 7:
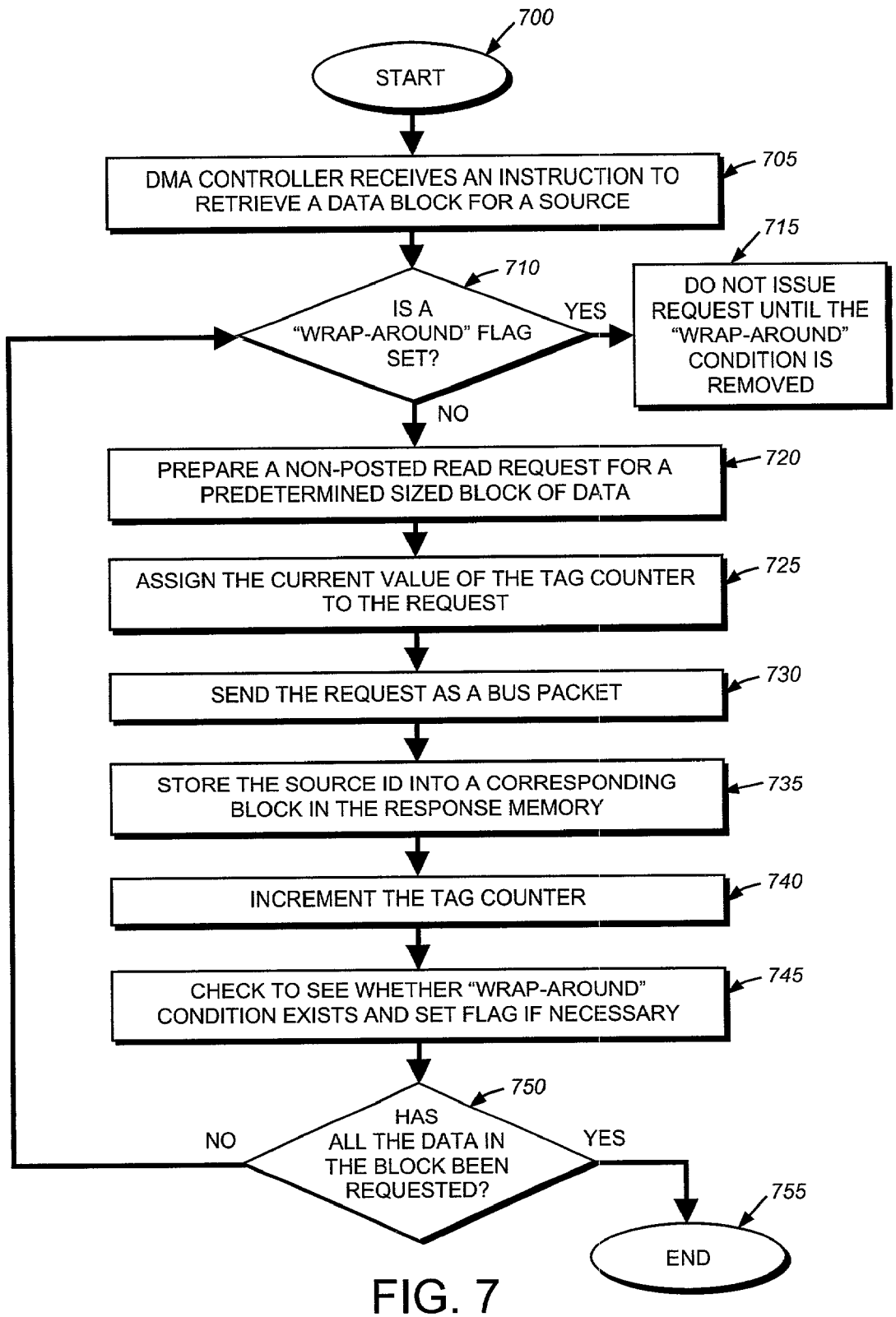
FIG. 7 is a flowchart of a method for requesting data according to the present invention.

FIG. 7 is a flowchart illustrating a sequence of steps for requesting data according to the present invention where the requested data can be reordered. The sequence starts at step 700 and proceeds to step 705 where a DMA controller receives an instruction from a source to retrieve a data block, such as a network data packet. The source request includes the length of the data requested and the address at which the requested data is stored. Because portions of the requested data block may be located in a plurality of I/O devices ("target" devices) or the requested data may be larger than a block of response memory, more than one non-posted read request may be necessary to retrieve the requested data block in its entirety.

However, before the DMA controller issues a non-posted read request, a flag 456 in the controller is checked to see whether a wrap-around condition exists (step 710). That is, the flag indicates whether a maximum number of requests are outstanding. If a wrap-around condition exists, then, at step 715, no additional requests are issued by the controller until one or more responses are received and the wrap-around condition is removed. However, at step 720, if a maximum number of outstanding responses have not been issued, then control logic in the DMA controller prepares a request for a predetermined sized portion of the requested data block.

Next, at step 725, the request is assigned an ID number corresponding to the value stored in a tag counter. At step 730, the request is sent as a bus packet to the target device storing the requested portion of data. At step 735, the ID of the source of the request is stored in the source ID field 680 corresponding to the tag ID. And, at step 740, the tag counter is incremented, e.g. by one. The wrap-around detector determines whether a wrap-around condition was established by sending the request and sets an appropriate flag if necessary, at step 745.

At step 750, the controller determines whether non-posted read requests have been issued for all the data requested by the source. If additional portions of the data block need to be retrieved, the controller prepares another non-posted read request as per steps 710–745. On the other hand, if all the data required by the source has been requested, the sequence ends at step 755.

Figure 8:
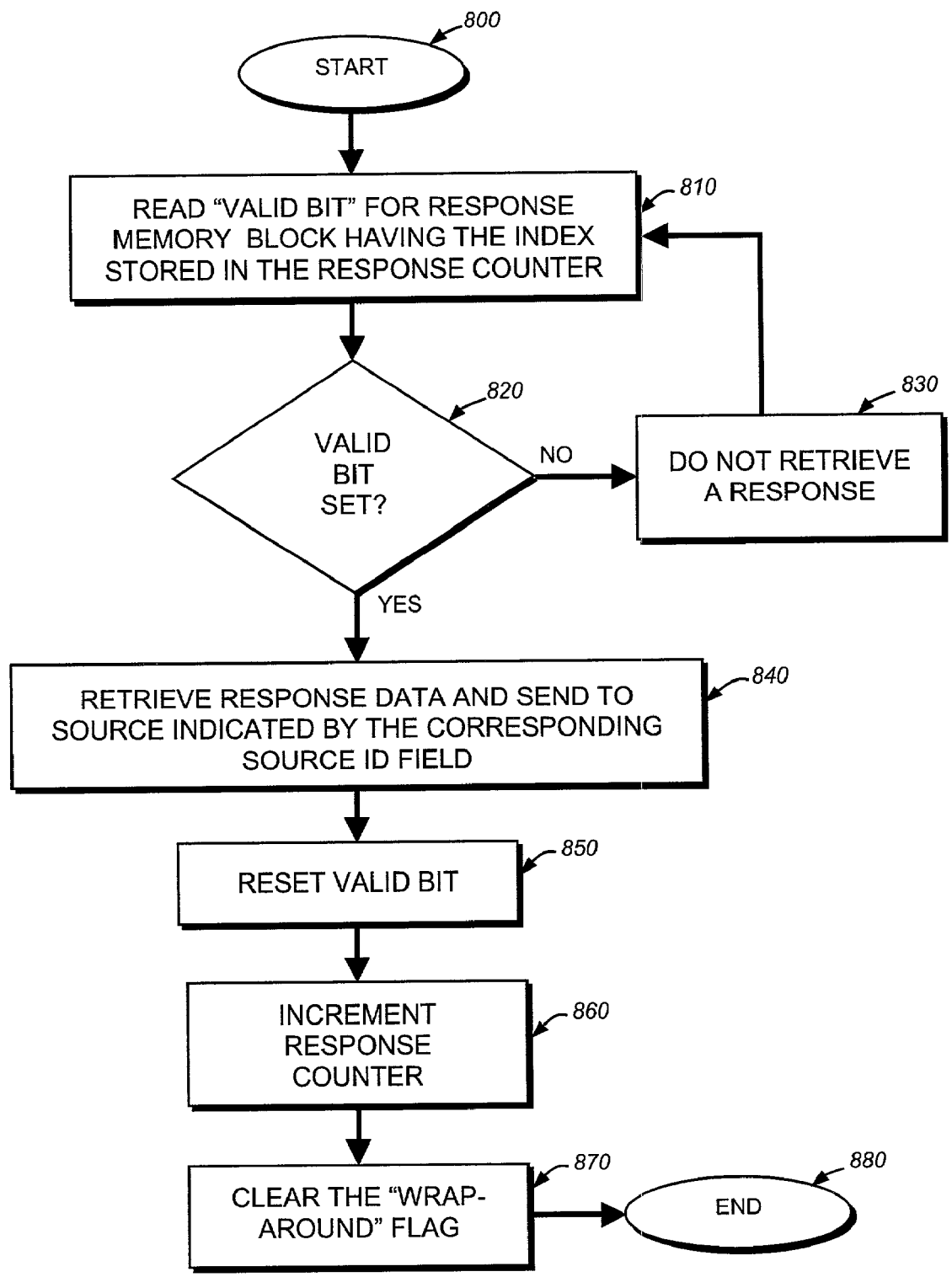
FIG. 8 is a flowchart of a method for reordering response data using the response memory of FIG. 6.

FIG. 8 is a flowchart illustrating a sequence of steps for reordering response data stored in the response memory of a DMA controller. The sequence starts at step 800 and proceeds to step 810 where control logic in the controller reads a valid bit for a memory block having an index equal to the value stored in a response counter 458. At step 820, the control logic determines whether the valid bit is set, e.g. equal to binary "1." If the valid bit indicates the indexed block of response memory does not comprise response data, then the control logic does not retrieve a response (step 830) and returns to step 810. When the valid bit indicates a response has been received for the desired block of response memory, at step 840, the response data is extracted from the memory block and sent to the source that is indicated by the source ID field 680.

At step 850, the valid bit is reset once the response data is extracted from the memory block. Then, at step 860, the index in the response counter is incremented, e.g. by one, to indicate the next block of response memory to be retrieved. Typically, the response counter is incremented in the same order as a corresponding tag counter so response data is returned to sources in the same order in which it was requested. Next, at step 870, the wrap-around flag is cleared. The sequence then ends at step 880.

C. Ordered and Unordered Response Data from a Split Transaction Bus

Although a DMA controller may reorder response data from a split transaction bus, the controller may also request data over the bus where the order of the responses does not matter. In other words, some response data may require a predetermined set of ordering rules whereas other response data does not. Typically, to retrieve a desired block of data, a DMA controller issues two requests: one for control information and the other for the data block. In general, the control information may be processed by the DMA controller in any order, although the data block is reconstructed in a predetermined order.

As an example, sources coupled to a DMA controller may initiate a request to retrieve two data packets, e.g., TCP/IP packets, stored in the memory of an I/O device located over a split transaction bus. For each requested packet, a source first requests control information that identifies, inter alia, the size and Location of the packet in the I/O device memory. The DMA controller processes each source request and issues a non-posted request to retrieve each packet's control information. Although the responses to these non-posted requests may arrive in a different order than the requests were issued, the order in which the control information is returned to the source may not matter. However, a source may use the received control information to request its corresponding data packet. Thus, the DMA controller may issue a plurality of non-posted requests to retrieve the data packet, where the response data must be ordered to assure the packet can be properly reconstructed.

Figure 9:
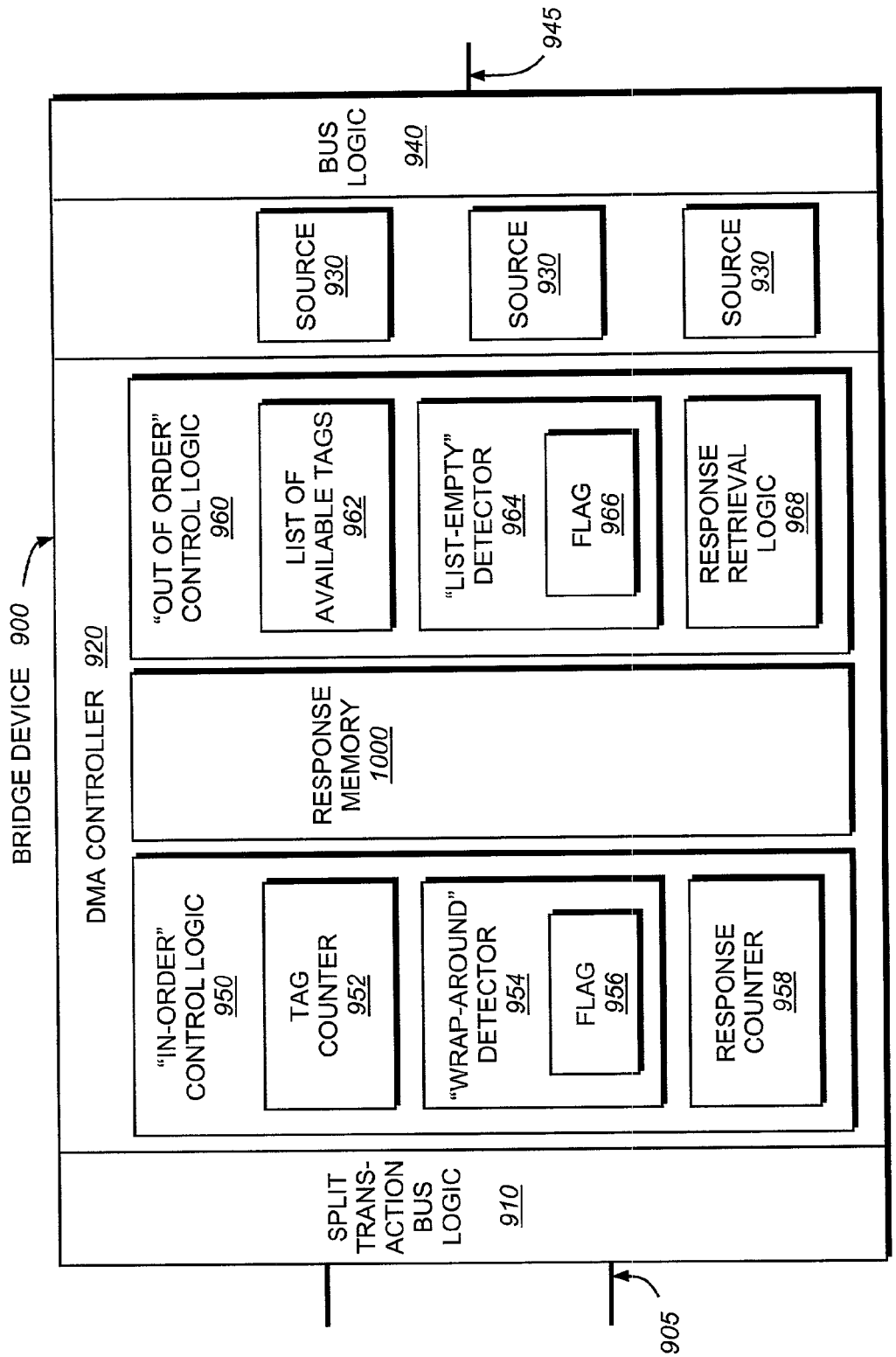
FIG. 9 is a schematic block diagram of a bridge device, in accordance with the present invention, having separate "in order" and "out of order" control logic in a DMA controller.

FIG. 9 illustrates a bridge device 900 having separate logic for handling responses from a split transaction bus 905 that are returned to sources in a predetermined order versus those returned to sources in any order. The retrieved response data may be subsequently retransmitted to a general communication link 945. As such, the bridge device includes a split transaction logic 910 to interface with the split transaction bus and includes bus logic 940 to interface with the general communication link. Bus logic 910 and 940 comprise, inter alia, transceivers, logic and queues to put data on and take data off each respective bus. Although only one split transaction bus is shown coupled to the logic 910, those skilled in the art will understand a plurality of buses may be connected to the bus logic when the bridge device is coupled to multiple I/O devices (e.g., see FIG. 3). Similarly, more than one general communication channel may be coupled to bus logic 940.

A plurality of sources 930 is tightly coupled to a DMA controller 920. Although the sources are shown within the bridge device, it is expressly contemplated they may be external to the bridge. Thus, the bridge may be understood as an intermediate device coupled to both the plurality of sources and a target device located over the bus 905. Broadly stated, the sources are logic blocks that initiate requests sent to the DMA controller 920. For example, the sources may request a data packet or control information stored in memory 335 coupled to the bridge device over the bus 905. The DMA controller receives the source requests and processes them using control logic 950 and response memory 1000 when the source indicates the responses should be returned in a predefined order ("in order"). The controller processes source requests using control logic 960 and response memory 1000 when the source indicates the responses may be returned in any order ("out of order"). To that end, an ordering flag associated with each source request (e.g., included in the request) may indicate whether its corresponding response is returned in a predetermined order or in any order. In response to a source request, the DMA controller 920 may issue one or more non-posted requests over the bus 905 using split transaction bus packets (shown in FIG. 5).

The control logic 950 manages non-posted requests when their associated responses are returned to one or more sources in a predetermined order. For every non-posted request, the control logic 950 issues a bus request that is assigned a "tag" identifying number or tag ID. Each tag ID provides an index into a location in the response memory. As each tag ID is assigned, an ID of the requesting source is stored in a corresponding location in the response memory.

The tag counter 952 generates a sequence of numbers based on a predetermined order, e.g. consecutive integers, and the value of the tag counter is used to assign a unique tag ID to each pending non-posted request. The width of the tag counter may limit the number of tag IDs that may be issued simultaneously, e.g. a 5 bit counter can assign a maximum of 32 ($2^5$) ID numbers without repetition. However, the maximum number of pending requests may also be limited by other design factors, such as bus bandwidth, and therefore can be set to any predetermined value. A "wrap-around" detector 954 is used by the control logic to set a flag 956 when the number of outstanding non-posted requests issued by control logic 950 equals the maximum permitted. Thus, no additional requests may be sent to the split transaction bus from logic 950 when the flag 956 is set.

The control logic 960 manages non-posted requests when their associated responses are returned to one or more sources in any order. For every non-posted request, the control logic 960 issues a bus packet that is assigned a "tag" identifying number or tag ID. Specifically, the control logic 960 maintains an unordered list of available tag numbers 962, and an ID number from the list is assigned to each pending non-posted request. Tag ID numbers that have been assigned are removed from the list whereas tag ID numbers of processed responses are put back on the list. Preferably, the range of tag ID values used by logic 960 does not overlap the values generated by tag counter 952. A "list-empty" detector 964 is used by the control logic to set a flag 966 when the number of outstanding non-posted requests issued by control logic 960 equals a maximum permitted, e.g. there are no tag ID numbers in the list of available tags 962. Thus, no additional requests may be sent to the split transaction bus from logic 960 when the flag 966 is set.

Responses to the non-posted requests are received by the bus logic 910 and transferred to a response memory 1000 in the DMA controller. The response memory comprises a unique memory block for every tag ID that may be assigned by tag counter 952 or assigned from the list of available tags 962. Thus, as responses are received over the split transaction bus 905, the responses are directed to blocks of response memory according to the tag ID of their corresponding requests. For example, if a non-posted request is issued with a tag ID equal to N, then a corresponding block of response memory 1000 is designated to store its response (e.g., the block of response memory is also assigned an ID number equal to N).

The control logic 950 uses a response counter 958 to extract responses stored in the blocks of response memory corresponding to the tag ID numbers generated by counter 952. Logic 950 extracts the responses in accordance with a predetermined set of ordering rules and may retrieve the responses in the same order their corresponding non-posted requests were issued. More specifically, the response counter generates a sequence of indexes that defines the order that the contents of the response memory blocks are returned to requesting sources. Therefore, response data is returned in a predetermined order to the sources 930 and may be subsequently forwarded to bus logic 940 and transferred to the general communication link 945.

In contrast, the control logic 960 uses response retrieval logic 968 to extract responses corresponding to the set of tag ID numbers that may be stored in the list 962. The retrieval logic extracts response data from the response memory in any order and, therefore, may return responses in the order they arrive even if they arrive "out of order." Furthermore, in contrast to the response counter used by control logic 950, the response retrieval logic 968 can periodically retrieve all responses in a predetermined range of response memory addresses without having to wait for any particular sequence of responses to arrive.

Operationally, the DMA controller 920 receives requests from a source 930 tightly coupled to the controller, such as a compression engine. The source sends its source identifier, the length of data blocks requested, the addresses at which the data is located (e.g., in an I/O device), and an indication whether the responses should be returned in a predetermined order. If the responses are to be returned in a predefined order, then the control logic 950 in the controller generates one or more bus packets to retrieve the data where each bus packet is assigned a unique tag identifier 512. If the responses are to be returned in any order, then the control logic 960 in the controller generates the bus packets and assigns each a unique tag identifier 512. The command ID field 514 is set to identify if a non-posted read request. Additionally, the bus packets include the amount of data 516 requested by the packet and the address 518 where the data is located. Since this is a non-posted request, the data section is not used.

A target device, such as an I/O device, returns the bus packet with elements of the request in the header section 510 and the requested data appended in the data section 520. The received bus packet ("response") may be subsequently stored in a block of a response memory corresponding to the tag ID 512. Because a response bus packet includes the same information as the request bus packet, the request and response have the same identifier 512.

Figure 10:
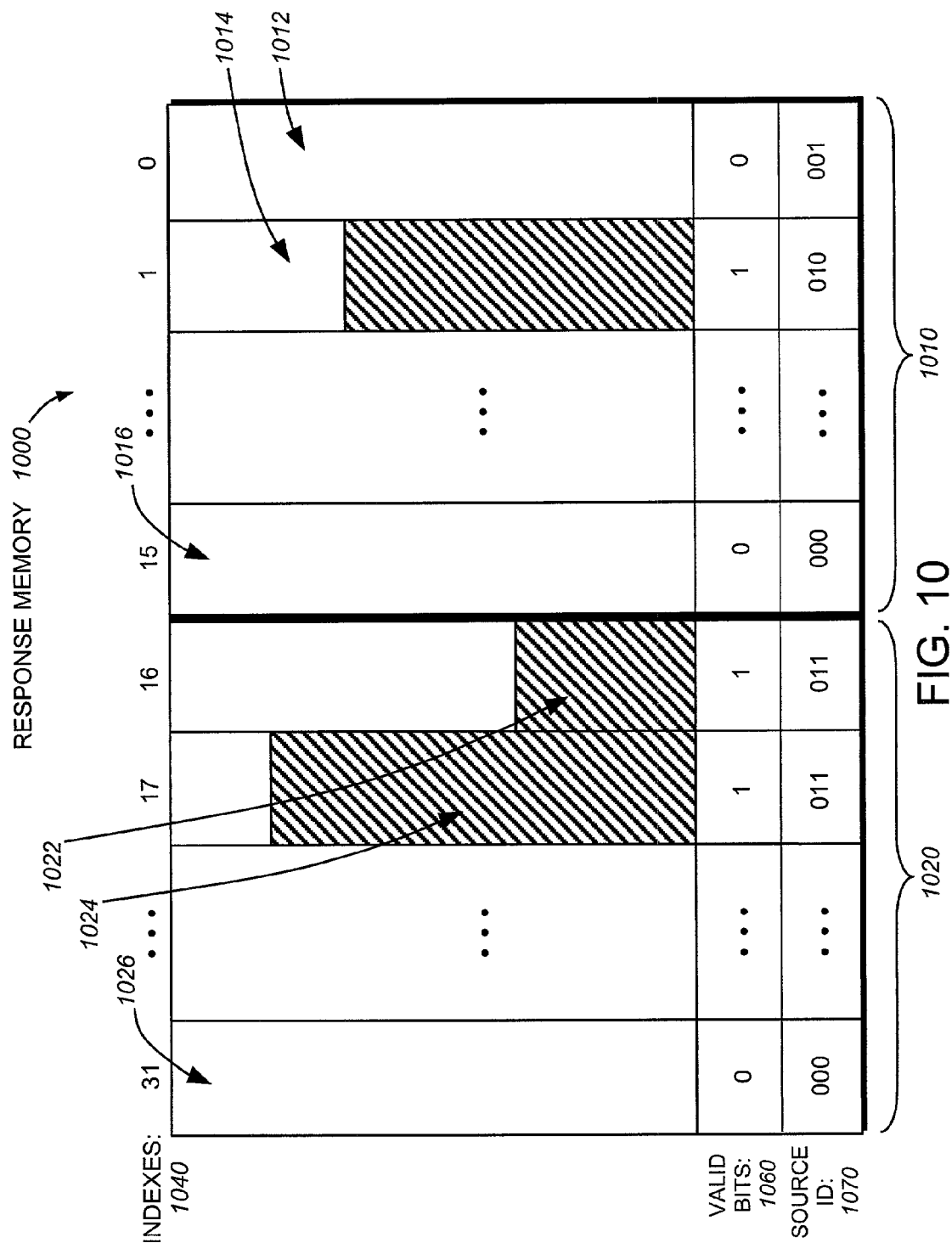
FIG. 10 is a schematic block diagram of an exemplary response memory that may be implemented in the bridge of FIG. 9.

FIG. 10 is a schematic block diagram of an exemplary response memory 1000 that may be implemented in the controller of FIG. 9. The response memory is partitioned into N blocks of a predetermined size, e.g. 64 bytes, where each block corresponds to one of N possible ID numbers either generated by the tag counter 952 or stored in the list of available tag IDs 962. Accordingly, each memory block is associated with an index 1040. The response memory may be "hard-partitioned," in hardware or software, so is responses are stored in portions of memory 1010 and 1020 depending on whether their tag IDs were assigned by control logic 950 or 960. For purposes of discussion, the response memory 1000 is shown having 32 blocks (0–31) whereby half the blocks store response data corresponding to tag IDs that may be generated by tag counter 952 (0–15) and the other half of the memory blocks store response data corresponding to tag IDs that may be stored in list 962 (16–31). Alternately, the blocks of response memory may be "soft-partitioned" by dynamically assigning index numbers, e.g. 0–31, as responses are received from the split transaction bus 905.

Each memory block is also associated with a "valid bit" 1060 and a source ID 1070. The valid bits indicate which memory blocks store responses that may be extracted from the response memory. For instance, a valid bit equal to "1" indicates memory blocks 1014, 1022 and 1024 store response data, and a valid bit equal to "0" indicates blocks 1012, 1016 and 1026 do not store response data. Notably, the amount of response data stored in a memory block (shaded in FIG. 10) may be less than or equal to the predetermined size of the memory block. The source ID 1070 stores the ID of the source of the request. For example, the source IDs shown indicate that memory block 1012 is designated to store a response to a non-posted request initiated by source 001, whereas responses for sources 010 and 011 are respectively stored in blocks 1014 and 1022 and 1024.

Figure 11:
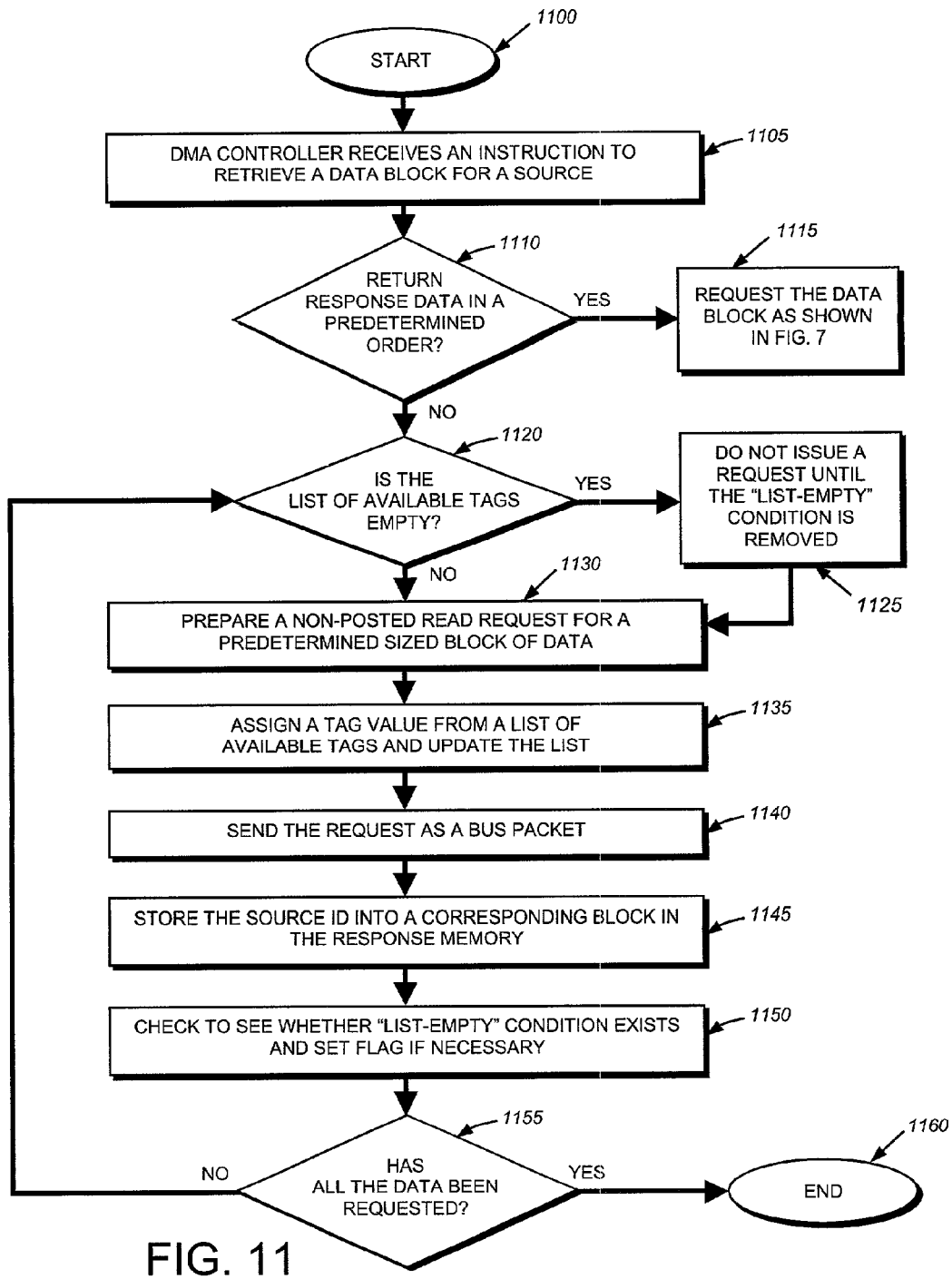
FIG. 11 is a flowchart of a method, according to the present invention, for requesting data where the corresponding responses may be returned "out of order;"

FIG. 11 is a flowchart illustrating a sequence of steps for requesting data according to the present invention where the requested data can be returned in any order. The sequence starts at step 1100 and proceeds to step 1105 where a DMA controller receives an instruction from a source to retrieve data, such as a block of control information. The source request includes the length of the data requested, the address at which the requested data is stored and an indication whether the response data should be returned to the source in a predetermined order. Because portions of the requested data block may be located in a plurality of I/O devices ("target" devices) or the requested data may be larger than a block of response memory, more than one non-posted read request may be necessary to retrieve the requested data block in its entirety.

At step 1110, the controller determines whether the source indicated response data should be returned in a predetermined order, e.g. an "ordering" flag in the instruction is set. If the response data requires a specific ordering, then the controller generates a request, at step 1115, according to the sequence illustrated in FIG. 7. However, if the response data can be returned in any order, a flag 966 in the controller is checked to see whether a "list-empty" condition exists, at step 1120. That is, the flag indicates whether a maximum number of requests are outstanding, i.e. a list of available tag ID numbers is empty. If a list-empty condition exists, then, at step 1125, no additional requests are issued by the controller until one or more responses are received and the list-empty condition is removed. However, at step 1130, if a maximum number of outstanding responses have not been issued, then control logic in the DMA controller prepares a non-posted read request for a predetermined sized portion of the requested data block.

Next, at step 1135, the request is assigned an ID number corresponding to a value stored in a list of available tag IDs. Once a tag ID is assigned to the request, the list of available ID numbers is updated to remove the tag number assigned. At step 1140, the non-posted read request is sent to the target device in a bus packet. At step 1145, the ID of the source device is stored in the source ID field 1070 of a block of response memory corresponding to the tag ID. Next, at step 1150, the list-empty detector determines whether a list-empty condition was established by sending the request and sets an the flag 966 if necessary.

At step 1155, the controller determines whether non-posted read requests have been issued for all the data requested by the source. If additional portions of the data block need to be retrieved, the controller prepares another non-posted read request as per steps 1120–1150. On the other hand, if all the data required by the source has been requested the sequence ends at step 1160.

Figure 12:
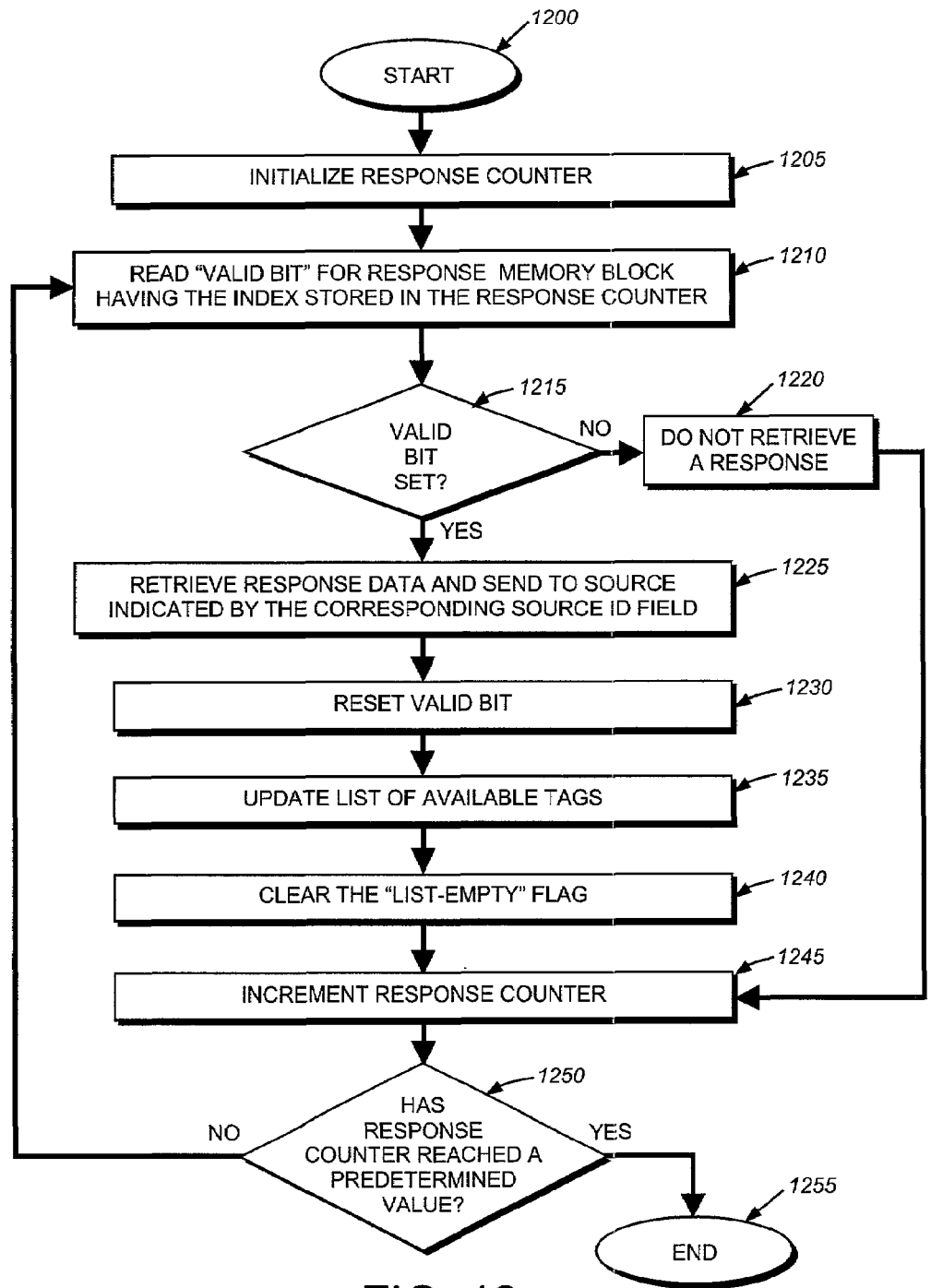
FIG. 12 is a flowchart of a method for retrieving unordered response data using the response memory of FIG. 10.

FIG. 12 is a flowchart illustrating a sequence of steps for returning response data in any order to one or more sources. The sequence starts at step 1200 and proceeds to step 1205 where a counter in the response retrieval logic 968 is initialized, e.g. set to a predetermined value. Although a counter is described, other techniques may also be implemented by the response retrieval logic. Next, at step 1210, the control logic 960 reads a "valid" bit for a memory block having an index corresponding to the value stored in the counter. At step 1215, the control logic determines whether the valid bit is set, e.g. equal to binary "1." If the valid bit indicates the indexed block of response memory does not comprise response data, then the control logic does not retrieve a response, at step 1220, and continues to check subsequent memory blocks as shown at step 1245. When the valid bit indicates a response has been received for the desired block of response memory, at step 1225, the response data is extracted from the memory block and sent to the source that initially requested the data as indicated by a corresponding source ID 1070.

At step 1230, the valid bit is reset once the response data is extracted from the memory block. If data was extracted from the response memory, the tag ID corresponding to the extracted response data is added to the list of available tag ID numbers, at step 1235. Additionally, at step 1240 the list-empty flag must be cleared. The index in the response counter is incremented, e.g. by one, to indicate the next block of response memory to be retrieved, at step 1245. Next, at step 1250, the response retrieval logic 968 determines whether the counter has reached a predetermined final value thereby indicating responses have been retrieved for those blocks of response memory that may comprise data that can be returned in any order. If the counter has not reached a predetermined value, the response logic continues to retrieve response data as per steps 1210–1245. On the other hand, if the counter has reached the predetermined value, the sequence ends at step 1255.

D. Byte-Swapping

Figure 13:
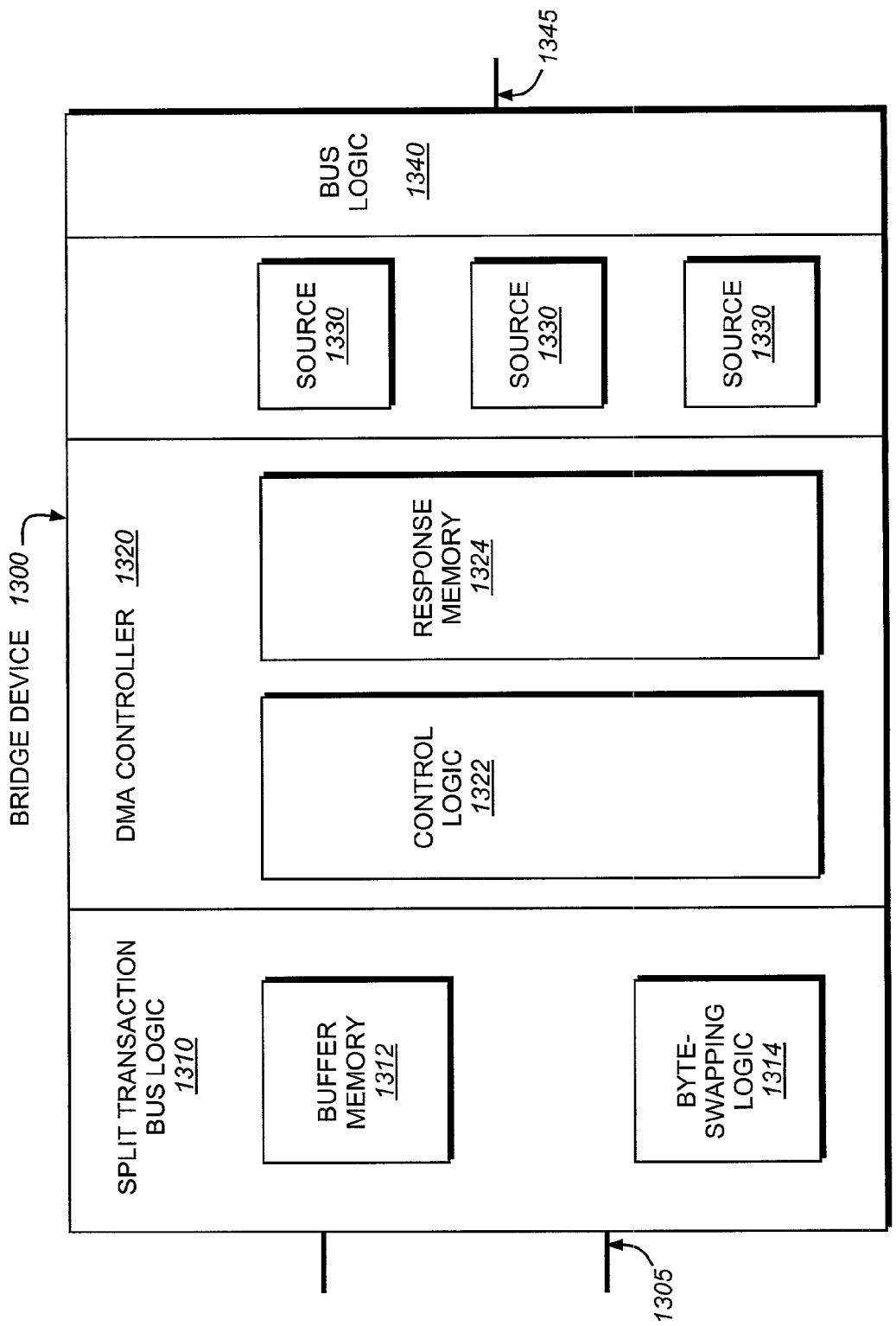
FIG. 13 is a schematic block diagram of a bridge device embodying the invention that may "byte-swap" a received response.

FIG. 13 illustrates a bridge device 1300 having added functionality within its split transaction bus logic 1310. In this arrangement, response data may be received over a split transaction bus 1305 and stored in buffer memory 1312. Depending on a predetermined condition, such as the state of a flag bit in the received response or whether the received response will be returned in a predefined order, byte-swapping logic 1314 may modify the received data before forwarding the data to DMA controller 1320. Although only byte-swapping logic is illustrated, other functionality may be also implemented in the bus logic 1310, such as parity checking, etc.

Regardless of whether the byte-swapping logic 1314 modifies the received response data, the data is transferred from the buffer memory to an appropriate block of control logic 1322 in the DMA controller. The control logic may direct the response data to a response memory 1324 before the responses are returned to their requesting sources 1330. The sources may subsequently pass the response data to bus logic 1340 coupled to a general communication link 1345.

Figure 14:
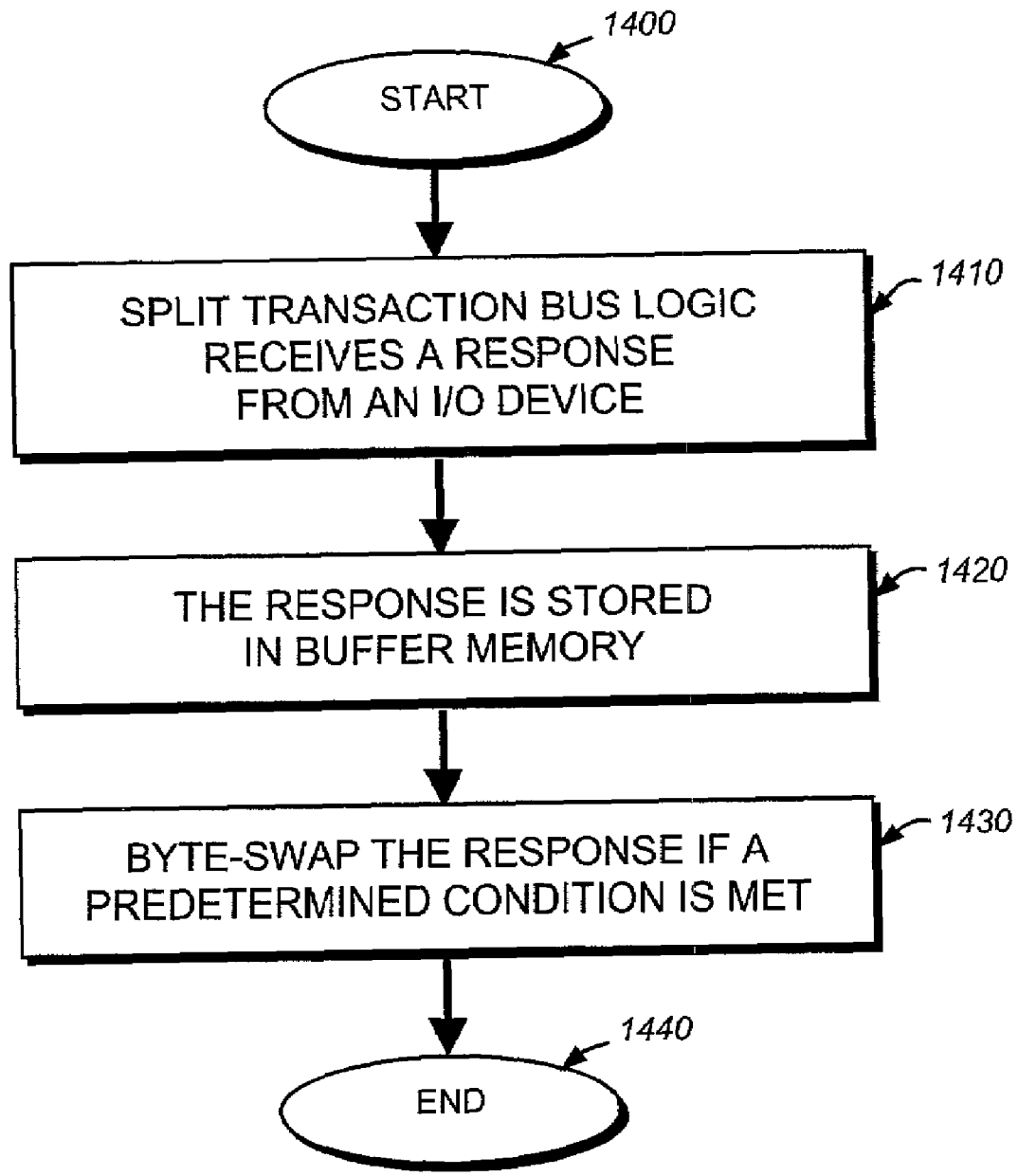
FIG. 14 is a flowchart of a method for byte-swapping a received response in accordance with the present invention.

FIG. 14 is a flowchart illustrating a sequence of steps for byte-swapping response data based on a predetermined condition. The sequence starts at step 1400 and proceeds to step 1410 where a split transaction bus logic receives a response from an I/O device coupled to the logic over a split transaction bus. At step 1420, the received response is stored in a buffer memory, e.g. located in the bus logic. Next, at step 1430, bytes within the received response are swapped (thereby changing the "endianness" of the response) if a predetermined condition is met, such as when an "ordering" flag or a predetermined bit flag associated with the response is set. The sequence ends at step 1440, and the response data in its current form may be transferred to a DMA controller.

E. CONCLUSION

The foregoing has been a detailed description of an illustrative embodiment of the invention. Various modifications and additions can be made without departing from the spirit and scope of the invention. For example, the list of available tags in the "out of order" control logic of a bridge device may instead be implemented as a tag counter that generates a different range of numbers than the counter in the "in order" control logic. That is, tag counter 952 may generate tag ID numbers between zero through N whereas a different tag counter 962 generates tag ID numbers between N+1 and M, where N and M are positive integers. Additionally, the response retrieval logic in the "out of order" control logic may implement various techniques for retrieving data from the response memory, such as periodically checking a designated range of memory blocks or returning responses as soon as they are stored in predetermined addresses of the response memory. Further, the DMA controller embodying the invention may distinguish an "in order" source request from an "out of order" request based on an ordering flag, source ID, status bit or register, etc. associated with the request.

While this description has been written in reference to bridge devices in an intermediate network node, the principles are equally pertinent to any device that couples a communication link capable of returning "out of order" data (e.g., a split transaction bus) with a communication link expecting data in a predetermined order (e.g., a cell-based or packet-based bus). Further, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. An intermediate device configured to receive data from one or more target devices located over a split transaction bus and to return the data in a predetermined order to one or more sources, the intermediate device comprising:
   (a) split transaction bus logic that couples the intermediate device to the split transaction bus; and
   (b) a DMA controller coupled to both the split transaction bus logic and the one or more sources, including:
      (i) a first control logic that issues requests for data to the split transaction bus logic and returns their corresponding responses in a predetermined order to the one or more sources; and
      (ii) a response memory that stores responses received by the split transaction bus logic,
   wherein the first control logic comprises:

(a) a tag counter that generates an identification number for each request issued by the first control logic;
(b) a wrap-around detector that prevents the first control logic from concurrently issuing more than a predetermined number of requests; and
(c) a response counter that generates a sequence of values indicative of the order in which the first control logic retrieves responses from the response memory.

2. The device of claim 1, wherein the wrap-around detector sets a wrap-around flag to indicate the predetermined number of requests have been concurrently issued by the first control logic.

3. A device configured to receive data from one or more target devices located over a split transaction bus and to return the data in a predetermined order to one or more sources, the device comprising:
(a) split transaction bus logic that couples the device to the split transaction bus; and
(b) a controller coupled to both the split transaction bus logic and the one or more sources, including:
(i) a first control logic that issues requests for data to the split transaction bus logic and returns their corresponding responses in a predetermined order to the one or more sources; and
(ii) a response memory that stores responses received by the split transaction bus logic,
wherein the first control logic comprises:
(a) a tag counter that generates an identification number for each request issued by the first control logic; and
(b) a response counter that generates a sequence of values indicative of the order in which the first control logic retrieves responses from the response memory.

4. The device of claim 3, wherein the response memory comprises a plurality of memory blocks, each memory block associated with an index, a source ID and a valid bit.

5. The device of claim 4, wherein the first control logic issues the requests for data in response to receiving a request from at least one of the sources.

6. The device of claim 5, wherein the first control logic associates a source ID corresponding to the at least one requesting source with a block of the response memory.

7. The device of claim 4, wherein a response associated with an identification number is stored in a block of the response memory associated with the same identification number, and the valid bit for the block of response memory is set when the block comprises the response.

8. The device of claim 7, wherein the first control logic extracts the response stored in the block of the response memory when (i) its valid bit is set and (ii) the index of the block of the response memory corresponds to the value of the response counter.

9. The device of claim 3, wherein the DMA controller further includes a second control logic that issues requests to the split transaction bus logic and returns their corresponding responses to the one or more sources in any order.

10. The device of claim 3, wherein the one or more sources forward the responses to a general communication link.

11. The device of claim 3, wherein the split transaction bus logic comprises a buffer memory and byte-swapping logic.

12. The device of claim 11, wherein each response received by the split transaction bus is stored in the buffer memory and byte-swapped if a predetermined condition is met.

13. The device of claim 12, wherein the predetermined condition depends on whether the first control logic or a second control logic in the DMA controller processes the received response.

14. The device of claim 3, wherein the first control logic issues requests in a logical order and returns their corresponding responses to the one or more sources in the same logical order in which the requests were issued.

15. An intermediate device configured to receive data from one or more target devices located over a split transaction bus and to return the data in a predetermined order to one or more sources, the intermediate device comprising:
(a) split transaction bus logic that couples the intermediate device to the split transaction bus; and
(b) a DMA controller coupled to both the split transaction bus logic and the one or more sources, including:
(i) a first control logic that issues requests for data to the split transaction bus logic and returns their corresponding responses in a predetermined order to the one or more sources; and
(ii) a response memory that stores responses received by the split transaction bus logic,
(iii) a second control logic that issues requests to the split transaction bus logic and returns their corresponding responses to the one or more sources in any order, the second control logic comprising:
(a) a list of available identification numbers, one of which is assigned to each request issued by the second control logic;
(b) a list-empty detector that prevents the second control logic from concurrently issuing more than a predetermined number of requests; and
(c) a response retrieval logic that retrieves responses stored in the response memory in any order.

16. The device of claim 10, wherein the list-empty detector sets a list-empty flag to indicate the predetermined number of requests have been concurrently issued by the second control logic.

17. The device of claim 15, wherein a response is processed by the first control logic if an ordering flag associated with its corresponding request is set, else the response is processed by the second control logic.

18. A method for retrieving a block of data over a split transaction bus by issuing an ordered sequence of requests, comprising the steps:
(a) preparing a request for a predetermined amount of the data after determining the number of outstanding requests over the bus does not exceed a maximum number;
(b) assigning the request an identification number;
(c) sending the request over the bus;
(d) storing a source identifier associated with the request;
(e) setting a wrap-around flag after the request is sent if the number of outstanding requests over the bus exceeds the maximum number; and
(f) repeating steps (a)–(e) until a sequence of requests have been issued for the entire block of data.

19. The method of claim 18, wherein the identification number is generated by a tag counter.

20. The method of claim 18, further comprising the steps:
(g) receiving a response from the split transaction bus;
(h) directing the response to a block of a response memory, the block of the response memory having an index associated with the identification number assigned to the response's corresponding request;
(i) setting a valid bit associated with the block of the response memory; and (j) repeating steps (g)–(i) for every response received over the bus.

21. The method of claim 20, further comprising the steps:
(k) reading a valid bit associated with a block of the response memory indexed by a response counter;
(l) if the valid bit read is set, then performing the steps of (i) retrieving a response from the indexed block of the response memory, (ii) resetting the valid bit for the block of the response memory and (iii) clearing the wrap-around flag; and
(m) incrementing the response counter.

22. A method for retrieving a block of data over a split transaction bus by issuing ordered and unordered sequences of requests, comprising the steps:
(a) preparing a request for a predetermined amount of the data after determining the number of outstanding requests over the bus does not exceed a maximum number;
(b) assigning the request an identification number generated by a tag counter if the block of data is to be returned in a predetermined order, else assigning the request an identification number stored in a list of available tag numbers;
(c) sending the request over the bus;
(d) storing a source identifier associated with the request;
(e) setting a flag after the request is sent if the number of outstanding requests over the bus exceeds the maximum number; and
(f) repeating steps (a)–(e) until a sequence of requests have been issued for the entire block of data.

23. The method of claim 22, wherein the block of data is byte-swapped based on whether the block of data is returned in a predetermined order.

24. An intermediate device that retrieves a block of data over a split transaction bus by issuing ordered and unordered sequences of requests, comprising:
(a) means for preparing a request for a predetermined amount of the data after determining the number of outstanding requests over the bus does not exceed a maximum number;
(b) means for assigning the request an identification number, whereby the identification number is either generated by a tag counter or stored in a list of available tag numbers;
(c) means for sending the request over the bus;
(d) means for storing a source identifier associated with the request; and
(e) means for setting a flag after the request is sent if the number of outstanding requests over the bus exceeds the maximum number.

25. The device of claim 24, further comprising:
(f) means for receiving a response from the split transaction bus;
(g) means for directing the received response to a block of a response memory, the block of the response memory having an associated index;
(h) means for setting a valid bit associated with the block of the response memory;
(i) means for reading the valid bit associated with the block of the response memory;
(j) means for retrieving the response from the block of response memory;
(k) means for resetting the valid bit associated with the block of the response memory; and
(l) means for incrementing the response counter.

26. A computer-readable media including instructions for execution by a processor, the instructions for a method of retrieving a block of data over a split transaction bus by issuing ordered and unordered sequences of requests, the method comprising the steps:
(a) preparing a request for a predetermined amount of the data after determining the number of outstanding requests over the bus does not exceed a maximum number;
(b) assigning the request an identification number generated by a tag counter if the block of data is to be returned in a predetermined order, else assigning the request an identification number stored in a list of available tag numbers;
(c) sending the request over the bus;
(d) storing a source identifier associated with the request;
(e) setting a flag after the request is sent if the number of outstanding requests over the bus exceeds the maximum number; and
(f) repeating steps (a)–(e) until a sequence of requests have been issued for the entire block of data.

27. The computer-readable media of claim 26, wherein the method further comprises the steps:
(g) receiving a response from the split transaction bus;
(h) directing the received response to a block of a response memory, the block of the response memory having an index associated with an identification number assigned to a request corresponding to the received response;
(i) setting a valid bit associated with the block of the response memory
(j) repeating steps (g)–(i) for every response received over the bus;
(k) reading a valid bit associated with a block of the response memory indexed by a response counter;
(l) if the valid bit read is set, then performing the steps of (i) retrieving a response from the block of the response memory, (ii) resetting the valid bit for the block of the response memory and (iii) clearing the flag; and
(m) incrementing the response counter.

28. A device coupled to a split transaction bus, the device comprising:
a controller configured to issue requests over the split transaction bus, each issued request soliciting a corresponding response to be returned over the split transaction bus;
a first counter configured to generate an identification number for inclusion in each issued request and in each corresponding response; and
the controller further configured to order responses received from the split transaction bus in a predetermined order, the predetermined order established by a sequence of values generated by a second counter, each value of the sequence matching one of the identification numbers of the responses.

29. The device of claim 28, further comprising:
a response memory configured to store the responses received from the split transaction bus.

30. The device of claim 28, wherein responses received from the split transaction bus are ordered in the same logical order in which their corresponding requests were issued.

31. The device of claim 28, wherein the controller is further configured to:
issue requests on behalf of one or more sources coupled to the device; and
forward the ordered responses to their respective requesting sources.

32. The device of claim 28, wherein the controller is a Direct Memory Access (DMA) controller.

33. The device of claim 28, wherein the split transaction bus is a HyperTransport (HPT) bus.

34. A method for ordering responses received over a split transaction bus, the method comprising:
   issuing a plurality of requests over the split transaction bus, each issued request soliciting a corresponding response over the split transaction bus;
   including in each request an identification number generated by a first counter,
   receiving from the split transaction bus a set of responses corresponding to one or more of the issued requests, each response including the identification number of the corresponding request; and
   ordering the received responses in a predetermined order, the predetermined order established by a sequence of values generated by a second counter, each value matching one of the identification numbers of the responses.

35. The method of claim 34, further comprising:
   storing the set of responses received from the split transaction bus in a response memory configured to store a plurality of responses.

36. The method of claim 34, the step of ordering the received responses in a predetermined order further comprises:
   ordering the received responses in the same logical order in which their corresponding requests were issued.

37. The method of claim 34, further comprising:
   associating each issued request with a corresponding source device; and
   forwarding each of the ordered responses to a source device associated with the response's corresponding request.

38. A device, comprising:
   means for issuing a plurality of requests over a split transaction bus, each issued request soliciting a corresponding response over the split transaction bus;
   means for including in each request an identification number generated by first a counter;
   means for receiving from the split transaction bus a set of responses corresponding to one or more of the issued requests, each response including the identification number of the corresponding request; and
   means for ordering the received responses in a predetermined order, the predetermined order established by a sequence of values generated by a second counter, each value matching one of the identification numbers of the responses.

39. The device of claim 38, further comprising:
   means for storing the set of responses received from the split transaction bus in a response memory configured to store a plurality of responses.

40. The device of claim 38, further comprising:
   means for ordering the received responses in the same logical order in which their corresponding requests were issued.

41. The device of claim 38, further comprising:
   means for associating each issued request with a corresponding source device; and
   means for forwarding each of the ordered responses to a source device associated with the response's corresponding request.

42. A computer-readable media including instructions for execution by a processor, the instructions for a method of ordering responses received over a split transaction bus, the instructions adapted to comprising the steps:
   issue a plurality of requests over the split transaction bus, each issued request soliciting a corresponding response over the split transaction bus;
   include in each request an identification number generated by a first counter;
   receive from the split transaction bus a set of responses corresponding to one or more of the issued requests, each response including the identification number of the corresponding request; and
   order the received responses in a predetermined order, the predetermined order established by a sequence of values generated by a second counter, each value matching one of the identification numbers of the responses.

43. The computer-readable media of claim 42, wherein the instructions are further adapted to:
   store the set of responses received from the split transaction bus in a response memory configured to store a plurality of responses.

44. The computer-readable media of claim 42, wherein the instructions are further adapted to:
   order the received responses in the same logical order in which their corresponding requests were issued.

45. A method for retrieving a block of data over a split transaction bus by issuing requests, the method comprising the steps of:
   generating an identification number for each request according to an ordered sequence;
   issuing each request to the split transaction bus;
   receiving responses from the split transaction bus in a first order, each response corresponding to one of the requests, each responses associated with the identification number of the corresponding request;
   storing the received responses in a memory;
   generating a sequence of values indicative of a second order in which to retrieve the responses from the memory, the second order different from the first order;
   retrieving responses from the memory according to the sequence of values and returning the responses in the second order.

46. The method of claim 45 wherein each value of the sequence of values corresponds to an identification number of one of the responses.

47. The method of claim 45 further comprising the step of:
   preventing the concurrent issue of more than a predetermined number of requests.

48. The method of claim 47 further comprises the step of:
   setting a wrap-around flag to indicate the predetermined number of requests have been concurrently issued.

49. The method of claim 45 wherein the step of issuing occurs in response to receiving a request from at least one source.

50. The method of claim 49 further comprising the step of:
   associating a source ID corresponding to the at least one source with a block of the memory.

51. The method of claim 49 wherein the request from at least one source is received on a general communication link.

52. The method of claim 45 wherein the split transaction bus is a HyperTransport (HPT) bus.

* * * * *